United States Patent
Pawliuk et al.

(10) Patent No.: US 10,432,247 B2
(45) Date of Patent: Oct. 1, 2019

(54) SEQUENCE TRIGGERING IN RF FRONT-ENDS

(71) Applicant: Intel IP Corporation, Santa Clara, CA (US)

(72) Inventors: Peter Pawliuk, Tempe, AZ (US); Simon A. Hughes, Chandler, AZ (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/464,000

(22) Filed: Mar. 20, 2017

(65) Prior Publication Data

US 2018/0269921 A1 Sep. 20, 2018

(51) Int. Cl.
*H04B 1/44* (2006.01)
*H04W 56/00* (2009.01)

(52) U.S. Cl.
CPC ............ *H04B 1/44* (2013.01); *H04W 56/002* (2013.01)

(58) Field of Classification Search
None
See application file for complete search history.

(56) References Cited

U.S. PATENT DOCUMENTS

| | | | |
|---|---|---|---|
| 5,471,212 A | 11/1995 | Sharpe et al. | |
| 2003/0142726 A1* | 7/2003 | Eltawil | H04B 1/709 375/146 |
| 2005/0012613 A1 | 1/2005 | Eckstein et al. | |
| 2007/0150711 A1* | 6/2007 | Kim | G06F 9/30105 712/228 |
| 2007/0186085 A1* | 8/2007 | Yim | G06F 9/4812 712/244 |
| 2008/0299913 A1* | 12/2008 | Han | H04B 1/48 455/83 |

(Continued)

FOREIGN PATENT DOCUMENTS

WO WO-2018175254 A1 9/2018

OTHER PUBLICATIONS

"International Application Serial No. PCT/US2018/022949, International Search Report dated Sep. 4, 2018", 3 pgs.

(Continued)

*Primary Examiner* — Chirag G Shah
*Assistant Examiner* — Suk Jin Kang
(74) *Attorney, Agent, or Firm* — Schwegman Lundberg & Woessner, P.A.

(57) ABSTRACT

Sequence trigger circuitry may be configured to repeat command sequences to switch between communication modes of a RFFE. The circuitry may include a first logic circuitry to, in response to a trigger signal, generate a first output signal or a second output signal to activate a first command sequence or a second command sequence, respectively. The circuitry may also include a second logic circuitry to activate a third command sequence based on a comparison of a clock output signal with a first timer value and upon generating the first output signal. The first command sequence and the third command sequence may switch the RFFE into a receive mode of the plurality of modes. The circuitry may include a third logic circuitry to activate a fourth command sequence based on a comparison of the clock output signal with a second timer value and upon generating the second output signal.

18 Claims, 12 Drawing Sheets

(56) References Cited

U.S. PATENT DOCUMENTS

| | | | | |
|---|---|---|---|---|
| 2009/0251221 A1* | 10/2009 | Gorbachov | ............. | H04B 1/48 330/301 |
| 2009/0253373 A1* | 10/2009 | Gorbachov | ............. | H04B 1/44 455/41.2 |
| 2009/0253384 A1* | 10/2009 | Gorbachov | ............. | H04B 1/44 455/83 |
| 2011/0299431 A1* | 12/2011 | Mikhemar | ............. | H04B 1/18 370/277 |
| 2011/0299435 A1* | 12/2011 | Mikhemar | ............. | H04B 1/18 370/278 |
| 2011/0299436 A1* | 12/2011 | Mikhemar | ............. | H04B 1/18 370/278 |
| 2011/0299437 A1* | 12/2011 | Mikhemar | ............ | H04B 1/0458 370/278 |
| 2011/0299438 A1* | 12/2011 | Mikhemar | ............ | H04B 1/0458 370/280 |
| 2013/0042068 A1* | 2/2013 | Chadwick, Jr. | ........ | G06F 12/123 711/122 |
| 2013/0077612 A1* | 3/2013 | Khorami | ............. | H04B 1/0458 370/338 |
| 2013/0166794 A1 | 6/2013 | Hatula et al. | | |
| 2013/0275700 A1* | 10/2013 | Wang | ................. | G06F 9/30116 711/162 |
| 2014/0325103 A1* | 10/2014 | Leitner | ............... | G06F 13/4291 710/110 |
| 2015/0002328 A1 | 1/2015 | Vaucher et al. | | |
| 2015/0181363 A1* | 6/2015 | Khorami | ............. | H04B 1/0458 370/297 |
| 2015/0193297 A1* | 7/2015 | Ngo | ....................... | G06F 11/221 714/758 |
| 2015/0193298 A1* | 7/2015 | Ngo | ........................ | G06F 11/08 714/758 |
| 2016/0077931 A1* | 3/2016 | Garcia | ............... | H03K 19/1776 711/162 |
| 2016/0248457 A1* | 8/2016 | Intrater | ................ | H04B 1/1027 |
| 2016/0248576 A1* | 8/2016 | Khorami | ............. | H04B 1/0458 |
| 2016/0359461 A1* | 12/2016 | He | ............................ | H03F 3/19 |
| 2016/0366683 A1* | 12/2016 | Park | ......................... | H04B 1/04 |
| 2017/0116141 A1* | 4/2017 | Mishra | .................... | G06F 13/16 |
| 2017/0118125 A1* | 4/2017 | Mishra | ................... | H04L 47/193 |
| 2017/0255578 A1* | 9/2017 | Ngo | ...................... | G06F 13/364 |
| 2017/0272230 A1* | 9/2017 | Khorami | ................ | H04W 4/00 |
| 2018/0060272 A1* | 3/2018 | Mishra | ................... | G06F 13/16 |
| 2018/0113834 A1* | 4/2018 | O'Shea | ............... | G06F 13/4291 |

OTHER PUBLICATIONS

"International Application Serial No. PCT/US2018/022949, Written Opinion dated Sep. 4, 2018", 6 pgs.

Sidhwani, Reema, "Antenna tuning for WCDMA RF front end", Aalto University, [Online] Retrieved from the internet: <https://aaltodoc.aalto.fi/handle/123456789/7659?show=full>, (Jan. 30, 2013), 1-64, 70 pgs.

* cited by examiner

SEQUENCE TRIGGERING IN RF FRONT-ENDS

TECHNICAL FIELD

Aspects of the disclosure pertain to radio frequency (RF) communications. Some aspects of the disclosure pertain to wireless communication devices. Some aspects of the disclosure pertain to front-end circuitry and radio integrated circuitry for wireless communication devices. Some aspects of the disclosure pertain to sequence triggering in RF front-ends (RFFEs).

BACKGROUND

Wireless communication systems, such as 5G time-domain duplexed (TDD) wireless systems, can be optimized for low latency communications where switching communication settings between transmit and receive modes for several MIMO layers may need repeated sequences of timed communications to multiple radio frequency (RF) processing blocks. The repeated communication sequences, however, should be timed precisely and written at fast speeds in order to meet the low-latency requirements of the wireless communication system. The repetition of the communication sequences, however, results in increased processing time and system inefficiencies. The inefficiencies can be further compounded with the introduction of configurable MIMO layers, where multiple receivers/transmitters are configured in a short amount of time with different control settings.

BRIEF DESCRIPTION OF THE FIGURES

In the figures, which are not necessarily drawn to scale, like numerals may describe similar components in different views. Like numerals having different letter suffixes may represent different instances of similar components. Some aspects of the disclosure are illustrated by way of example, and not limitation, in the following figures of the accompanying drawings.

DETAILED DESCRIPTION

The following description and the drawings sufficiently illustrate specific aspects of the disclosure to enable those skilled in the art to practice them. Other aspects of the disclosure may incorporate structural, logical, electrical, process, and other changes. Portions and features of some aspects of the present disclosure may be included in, or substituted for, those of other aspects of the present disclosure. Given the benefit of the present disclosure, persons skilled in the relevant technologies will be able to engineer suitable variations to implement principles of the aspects of the present disclosure in other types of communication systems. Various diverse aspects of the present disclosure may incorporate structural, logical, electrical, process, and other differences. Portions and features of some aspects of the present disclosure may be included in, or substituted for, those of other aspects of the present disclosure. Aspects of the disclosure set forth in the claims encompass all presently-known, and after-arising, equivalents of those claims.

Figure 1:
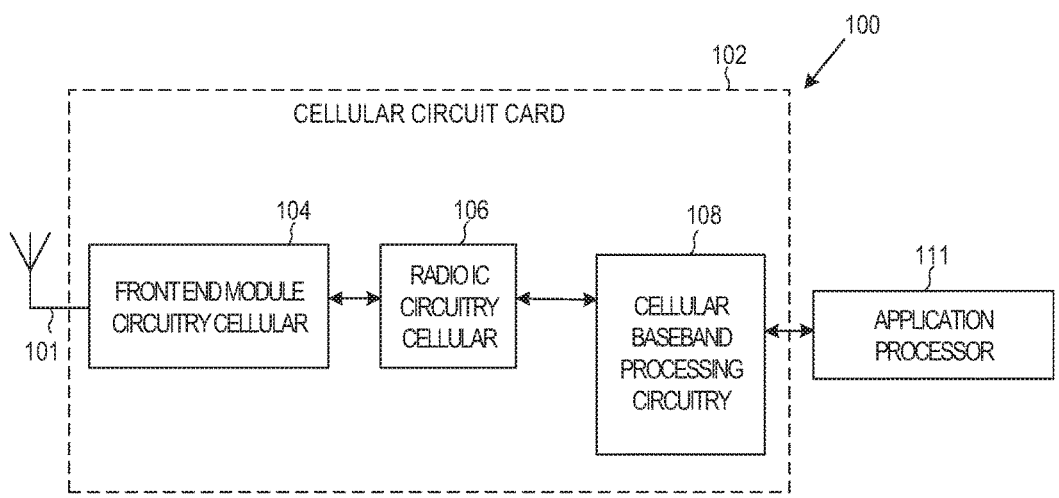
FIG. 1 is a block diagram of a radio architecture in accordance with some aspects of the present disclosure.

FIG. 1 is a block diagram of a radio architecture 100 in accordance with some aspects of the present disclosure. Radio architecture 100 may include radio front-end module (FEM) circuitry 104, radio IC circuitry 106 and baseband processing circuitry 108. Radio architecture 100, as shown, includes cellular functionalities although aspects of the disclosure are not so limited. For example, the radio architecture may also include Wireless Local Area Network (WLAN) functionality and Bluetooth (BT) functionality.

FEM circuitry 104 may include a receive signal path comprising circuitry configured to operate on RF signals received from one or more antennas 101, to amplify the received signals and to provide the amplified versions of the received signals to the radio IC circuitry 106 for further processing. FEM circuitry 104 may also include a transmit signal path, which may include circuitry configured to amplify signals provided by the radio IC circuitry 106 for wireless transmission by one or more of the antennas 101. In the example of FIG. 1, although FEM 104 is shown as being for cellular signals, aspects of the present disclosure are not so limited, and include within their scope the use of an FEM (not shown) that includes a transmit path and/or a receive path for WLAN and/or BT signals, or the use of one or more FEM circuitries where at least some of the FEM circuitries share transmit and/or receive signal paths for both WLAN and BT signals.

Radio IC circuitry 106 as shown may include a receive signal path which may include circuitry to down-convert RF signals (e.g., cellular signals) received from the FEM circuitry 104 and provide baseband signals to the baseband processing circuitry 108. The radio IC circuitry 106 may also include a transmit signal path which may include circuitry to up-convert cellular baseband signals provided by the cellular baseband processing circuitry 108, and provide RF output signals to the FEM circuitry 104 for subsequent wireless transmission by the one or more antennas 101. In the example of FIG. 1, although radio IC circuitry 106 is shown as being for cellular signals, aspects of the present disclosure are not so limited, and include within their scope the use of an FEM (not shown) that includes a transmit path and/or a receive path for WLAN and/or BT signals, or the use of one or more FEM circuitries where at least some of the FEM circuitries share transmit and/or receive signal paths for both WLAN and BT signals.

Baseband processing circuitry 108 may include a memory, such as, for example, a set of RAM arrays in a Fast Fourier Transform or Inverse Fast Fourier Transform block (not shown). The baseband circuitry 108 may further include one or more processors and control logic to process the signals received from the corresponding receive signal path of the radio IC circuitry 106, and to also generate corresponding baseband signals for the transmit signal path of the radio IC circuitry 106. The baseband processing circuitry 108 may further include physical layer (PHY) and medium access control layer (MAC) circuitry, and may further interface with an application processor 111 for generation and processing of the baseband signals and for controlling operations of the radio IC circuitry 106.

In some aspects of the present disclosure, the front-end module circuitry 104, the radio IC circuitry 106, and baseband processing circuitry 108 may be provided on a single radio card, such as a cellular radio card (or chipset) 102. In some other aspects of the present disclosure, the radio IC circuitry 106 and the baseband processing circuitry 108 may be provided on a single chip or integrated circuit (IC).

Figure 2:
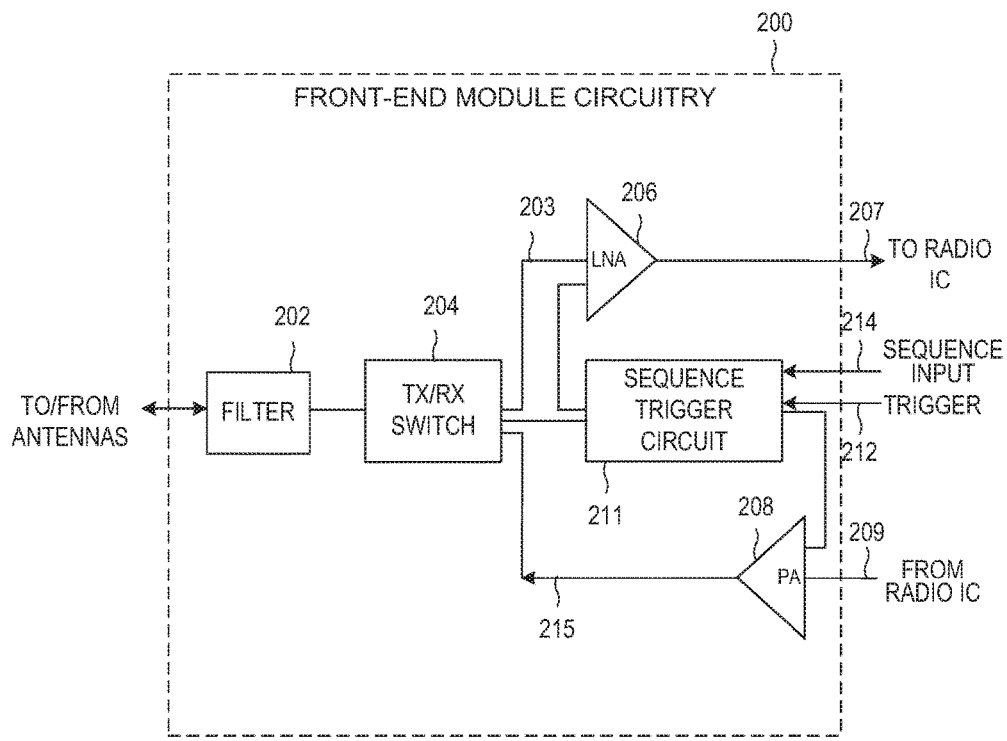
FIG. 2 illustrates a front-end module circuitry with sequence trigger circuitry for use in the radio architecture of FIG. 1 in accordance with some aspects of the present disclosure.

FIG. 2 illustrates a front-end module (FEM) circuitry 200 with sequence trigger circuitry for use in the radio architecture of FIG. 1 in accordance with some aspects of the present disclosure. The FEM circuitry 200 is one example of circuitry that may be suitable for use as the FEM circuitry 104 (FIG. 1), although other circuitry configurations may also be suitable.

In some aspects of the present disclosure, the FEM circuitry 200 may include one or more filters 202, transmit (TX)/receive (RX) switch(es) 204 to switch between transmit mode and receive mode operation. The FEM circuitry 200 may include a receive signal path and a transmit signal path. The receive signal path of the FEM circuitry 200 may include low-noise amplifier(s) (LNA) 206 to amplify received RF signals 203, and provide the amplified received RF signals 207 as an output (e.g., to the radio IC circuitry 106 (FIG. 1)).

The transmit signal path of the FEM circuitry 200 may include power amplifier(s) (PA) to amplify input RF signals 209 (e.g., provided by the radio IC circuitry 106), and one or more filters (e.g., filter 202), such as band-pass filters (BPFs), low-pass filters (LPFs) or other types of filters, to generate RF signals 215 for subsequent transmission (e.g., by one or more of the antennas 101 (FIG. 1)).

In an example, the FEM circuitry 104 may include a sequence trigger circuit 211, which may comprise suitable circuitry, logic, interfaces and/or code and can be used to reduce timing requirements and data payload associated with data communications to and from the FEM circuitry 200 at each duplexing transition. In an example, the sequence trigger circuit can include a plurality of registers (e.g., shadow registers) and a counter to perform trigger timing in executing a pre-programmed sequence. The RF settings and the timing can be pre-programmed once and stored in the registers, and then continually cycled using a single trigger to save bus usage time, control bus and processing resources when executing repetitive functions associated with data (e.g., signal) communications and duplexing transitions. For example, sequence input 214 can be used to store (pre-program) one or more command sequences, which (when executed) can be used to perform functionalities that are repetitive during data communication modes of the radio architecture 100. One or more of the functionalities may be performed by the sequence trigger circuit 211 upon receiving a trigger signal 212. In an example, the trigger signal 211 may be generated by the application processor 111, or by another processor within the chipset 102. In this regard, multiple shadow registers can be used for executing multiple/repeated states (e.g., as found in a TDD communication system), thereby significantly reducing RFFE control bus traffic, reducing a number of bus contention instances, and reducing transition guard band time requirements. Further description of example sequence trigger circuit is provided herein in reference to FIGS. 5A-11.

In an example, the FEM circuitry 200 can include only circuitry used to process receive signals (e.g., Rx only FEM circuitry). In this case, the sequence trigger circuit can perform functions described herein and in connection with Rx signal processing.

In an example, the signal processing requirements of a modern radio communication system may necessitate multiple communication messages to configure the RFFE at each duplexing transition. These messages, however, can be difficult to apply when latency requirements are strict because the communication time margins may become difficult to meet. The solution using multiple communication messages for RFFE configuration can also be inefficient as the same information may often be written to the RFFE repeatedly. By using the sequence trigger circuitry as disclosed herein, communication messages (e.g., command sequences for activating or deactivating various RFFE functionalities) can be pre-programmed (or stored) and triggered/activated based on timed trigger signals, thereby improving the timing accuracy of the sequences and reducing the amount of data that has to be written at every duplexing transition.

Figure 3:
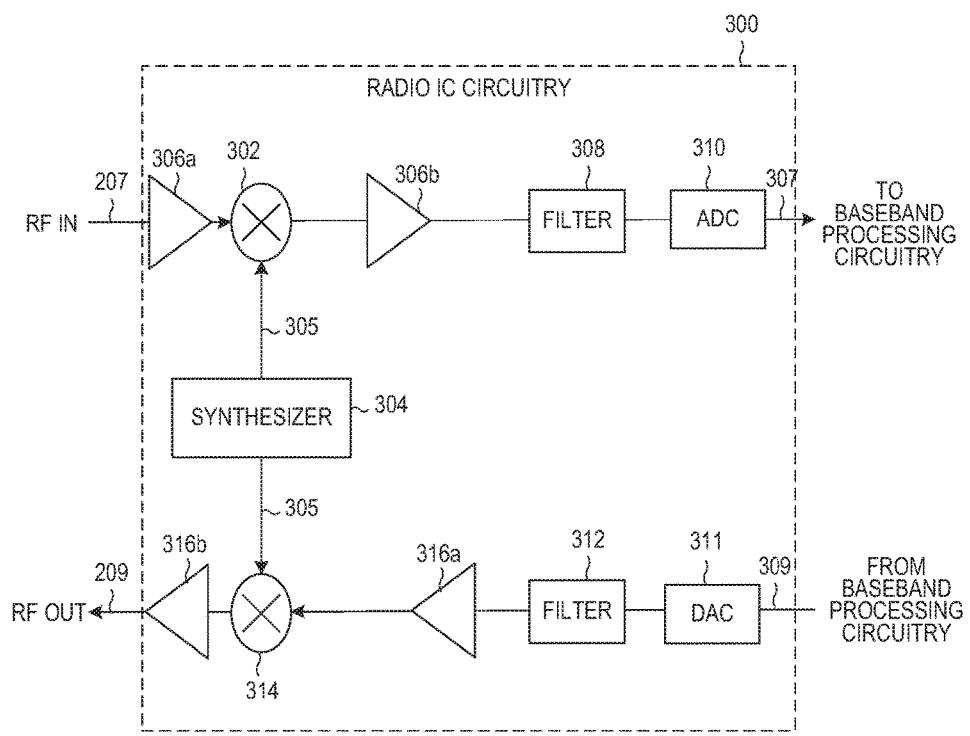
FIG. 3 illustrates a radio IC circuitry for use in the radio architecture of FIG. 1 in accordance with some aspects of the present disclosure.

FIG. 3 illustrates radio IC circuitry 300 in accordance with some aspects of the present disclosure. The radio IC circuitry 300 is one example of circuitry that may be suitable for use as the radio IC circuitry 106 (FIG. 1), although other circuitry configurations may also be suitable.

In some aspects of the present disclosure, the radio IC circuitry 300 may include a receive signal path and a transmit signal path. The receive signal path of the radio IC circuitry 300 may include at least mixer circuitry 302 coupled to a synthesizer 304, such as, for example, down-conversion mixer circuitry, amplifier circuitry 306 (e.g., 306a-306b), filter circuitry 308, and analog-to-digital converter (ADC) circuitry 310. The transmit signal path of the radio IC circuitry 300 may include at least digital-to-analog converter (DAC) circuitry 311, filter circuitry 312, amplifier circuitry 316 (e.g., 316a-316b), and mixer circuitry 314, such as, for example, up-conversion mixer circuitry. Radio IC circuitry 300 may also include synthesizer circuitry 304 for synthesizing a frequency 305 for use by the mixer circuitry 302 and the mixer circuitry 314.

Referring back to FIG. 1, in some aspects of the present disclosure, the antennas 101 (FIG. 1) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) aspects of the present disclosure, the antennas may be effectively separated to take advantage of spatial diversity and the different channel characteristics that may result. Antennas 101 may each include a set of phased-array antennas, although aspects of the present disclosure are not so limited.

Figure 4A:
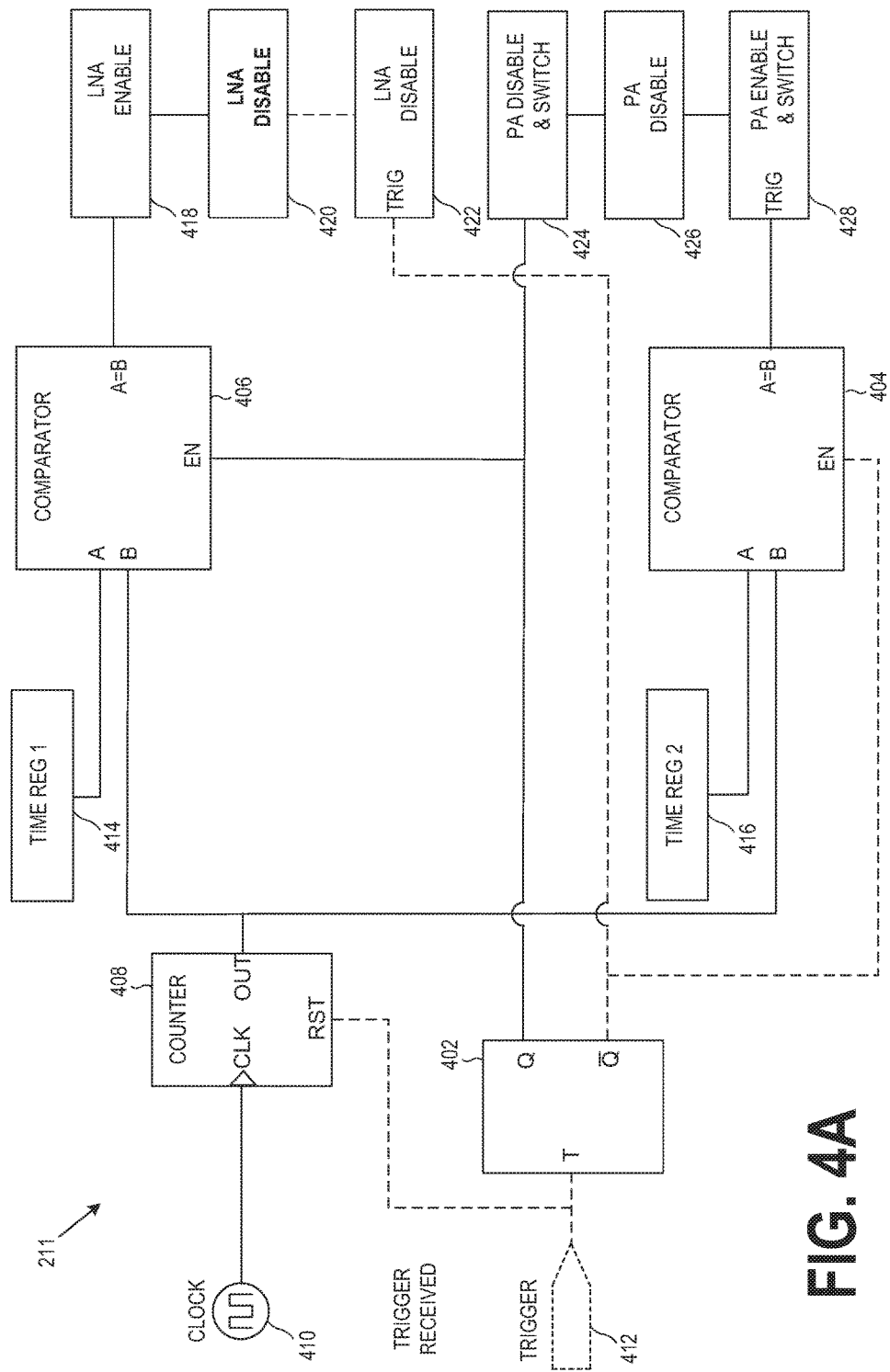
FIG. 4A and FIG. 4B illustrates sequence trigger circuitry during a Rx-to-Tx switching operation in accordance with some aspects of the present disclosure.
Figure 4B:
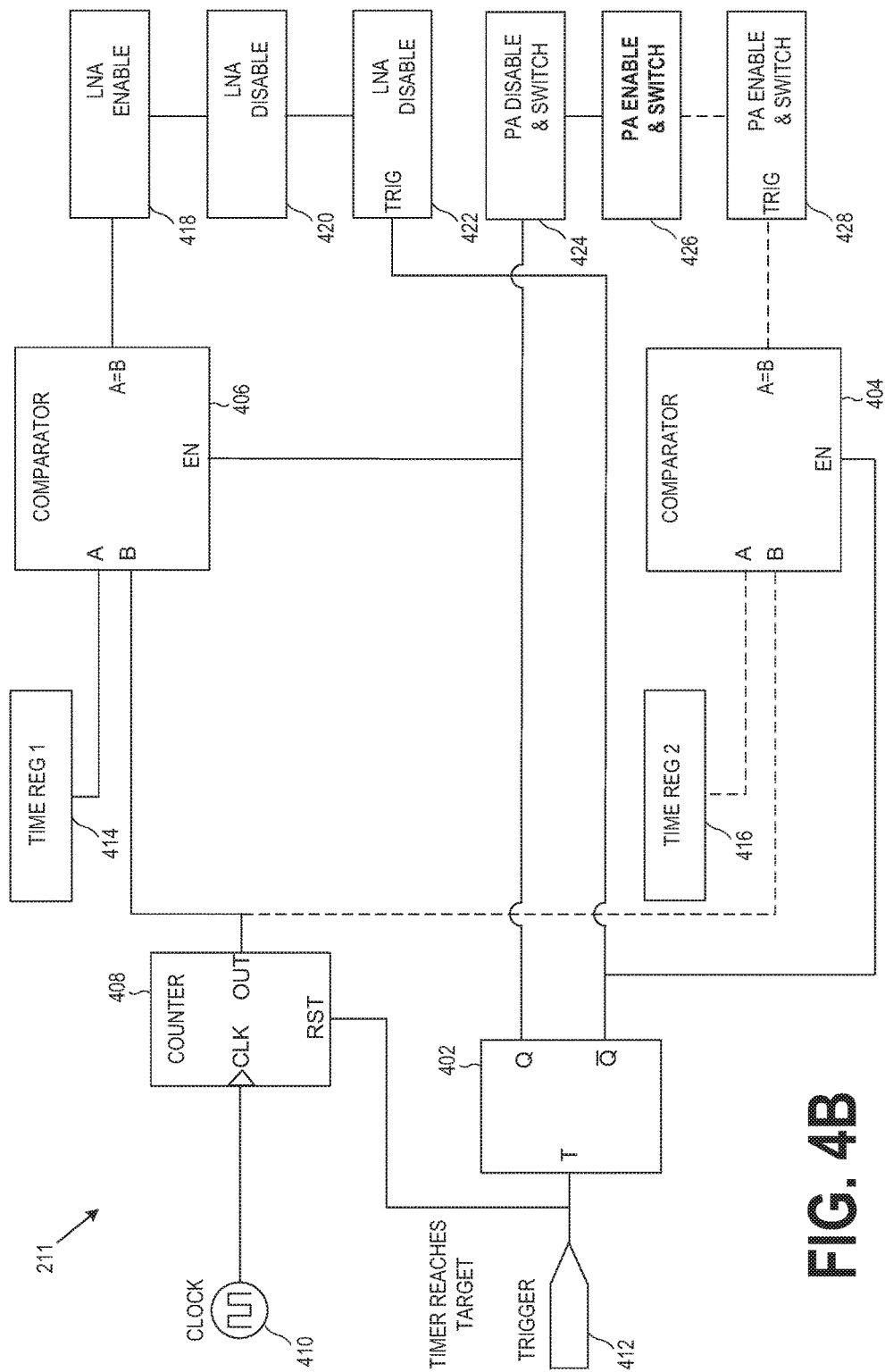

FIG. 4A and FIG. 4B illustrates sequence trigger circuitry during a Rx-to-Tx switching operation in accordance with some aspects of the present disclosure. Referring to FIG. 4A, the sequence trigger circuit 211 can be implemented using digital logic circuitry within an RFFE to reduce latency and payload requirements on the communications to and from the baseband circuitry.

The sequence trigger circuit 211 can include multiple shadow registers 418 and 422 coupled to an active register 420, as well as multiple shadow registers 424 and 428 coupled to active register 426. Each of the shadow registers 418, 422, 424, and 428 may store command sequences used to perform functionalities associated with processing data by the RFFE. For example, the shadow registers may store command sequences for enabling (or activating) a low-noise amplifier (such as LNA 206), disabling (or deactivating) the LNE, enabling a power amplifier (PA) (such as PA 208), and disabling the PA. Additionally, the command sequences may also include commands to switch the RFFE active modes, such as switching from receiving to transmitting, and vice versa. In an example, the switching of the active modes may take place at the time of enabling or disabling the PA.

In an example, a command sequence can be activated by triggering one of the shadow registers to copy the command sequence it stores within the active register it is associated with for execution. For example, command sequences stored within the shadow registers 418 and 422 can be copied into (at different times) the active register 420 and then the sequence can be executed.

The sequence trigger circuit 211 can further include a flip-flop 402 configured to receive a trigger signal 412, and a counter coupled to a clock 410. The sequence trigger circuit can further include comparators 404 and 406. The first comparator 406 can include a first input (A) coupled to a first time register 414, and a second input (B) receiving an output clock signal generated by the counter 408. An output of the first comparator 406 is coupled to shadow register 418. The comparator 406 can be enabled by communicating a signal to the EN terminal. After the comparator 406 is enabled, the comparator compares the pre-configured time value stored within register 414 and the clock output signal. When the clock output signal reaches the time value in register 414 (i.e., condition A=B is satisfied), the comparator 406 generates an output signal to the shadow register 418, resulting in the command sequence stored in shadow register 418 to be stored in active register 420 for execution.

The second comparator 404 can include a first input (A) coupled to a second time register 416, and a second input (B) receiving the output clock signal generated by the counter 408. An output of the second comparator 404 is coupled to shadow register 428. The comparator 404 can be enabled by communicating a signal to the EN terminal. After the comparator 404 is enabled, the comparator compares the pre-configured time value stored within register 416 and the clock output signal. When the clock output signal reaches the time value in register 416 (i.e., condition A=B is satisfied), the comparator 404 generates an output signal to the shadow register 428, resulting in the command sequence stored in shadow register 428 to be stored in active register 426 for execution.

Figure 6:
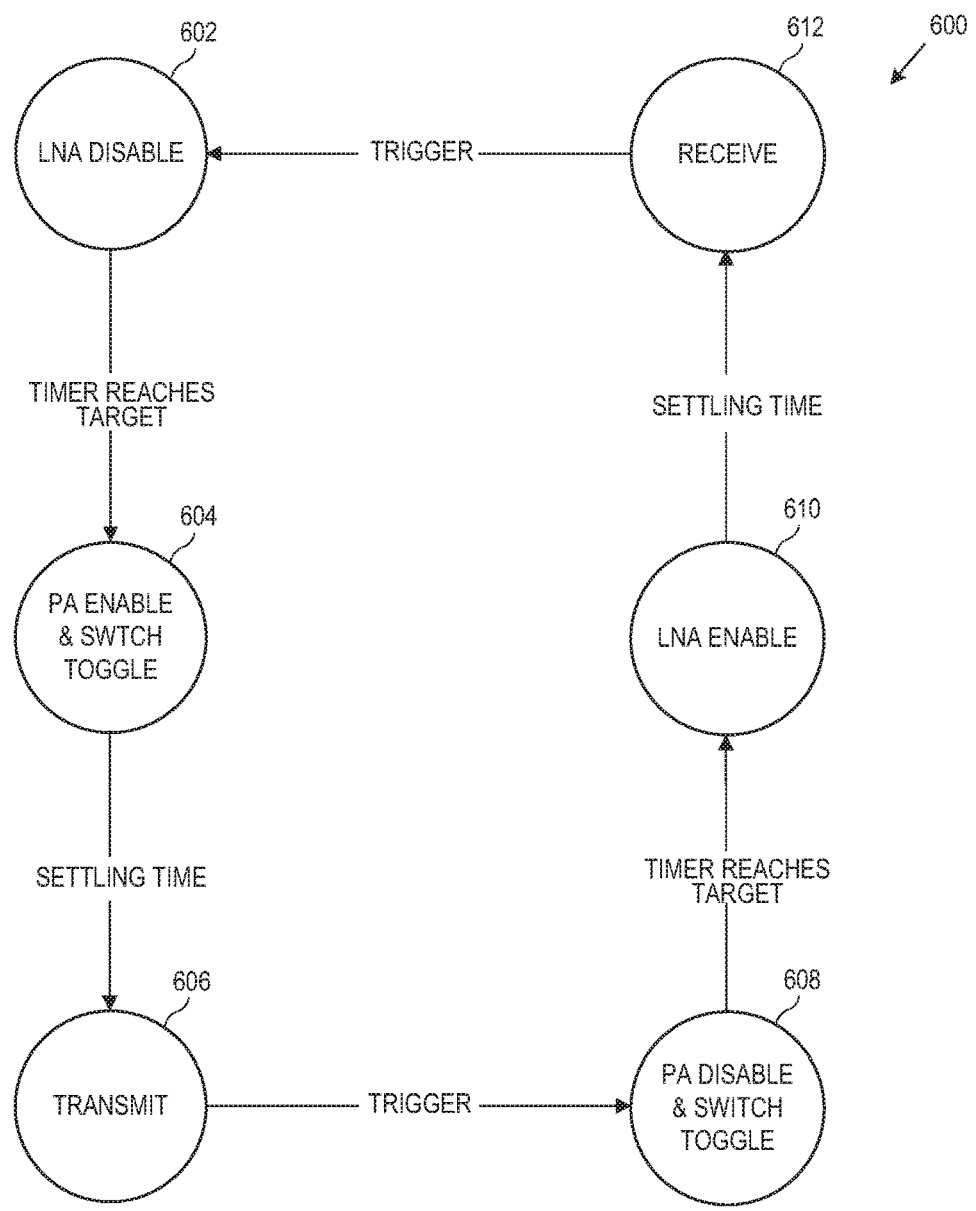
FIG. 6 is a state diagram illustrating functionalities performed by a sequence trigger circuitry during receive/transmit communication modes in accordance with some aspects of the present disclosure.

FIG. 6 is a state diagram illustrating functionalities performed by a sequence trigger circuitry during receive/transmit communication modes in accordance with some aspects of the present disclosure. Referring to FIGS. 4A, 4B, and 6, in an example operation, the RFFE (e.g., 200) may be in a receive mode when a single trigger signal 412 is communicated and received by the flip-flop 402. For example and as seen in diagram 600, the RFFE 200 may be in a receive mode 612.

The trigger signal 412 is also communicated to the reset (RST) terminal of the counter 408, resulting in a reset of the counter 408. The flip-flop 402 can activate a first output resulting in the trigger signal enabling the comparator 404 and the shadow register 422. The LNA disable command sequence stored within shadow register 422 is stored in the active register 420 and executed, resulting in disabling the LNA 206. The "LNA disable" state is indicated as 602 in FIG. 6. After the clock output signal reaches the time value in register 416, the trigger signal is also output by comparator 404 to shadow register 428 (as seen in FIG. 4B). The "PA enable and switch" command sequence stored within shadow register 428 is stored in the active register 426 and executed, resulting in enabling the PA 208 being enabled and the RFFE being switched to data transmit mode. The "PA enable and switch" state is indicated as 604, and the RFFE being in transmit state is indicated as 606 in FIG. 6.

Figure 5A:
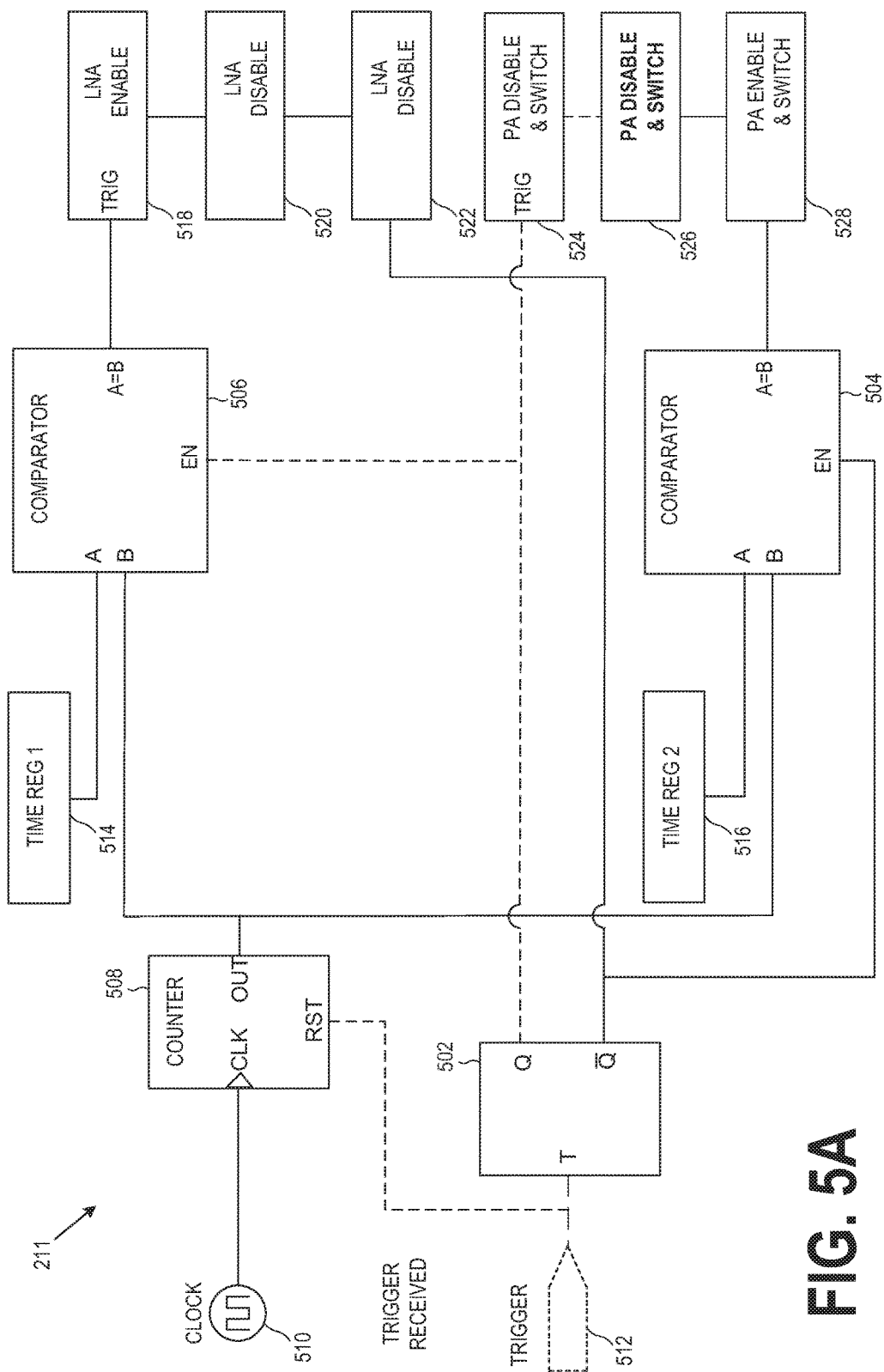
FIG. 5A and FIG. 5B illustrates sequence trigger circuitry during a Tx-to-Rx switching operation in accordance with some aspects of the present disclosure.
Figure 5B:
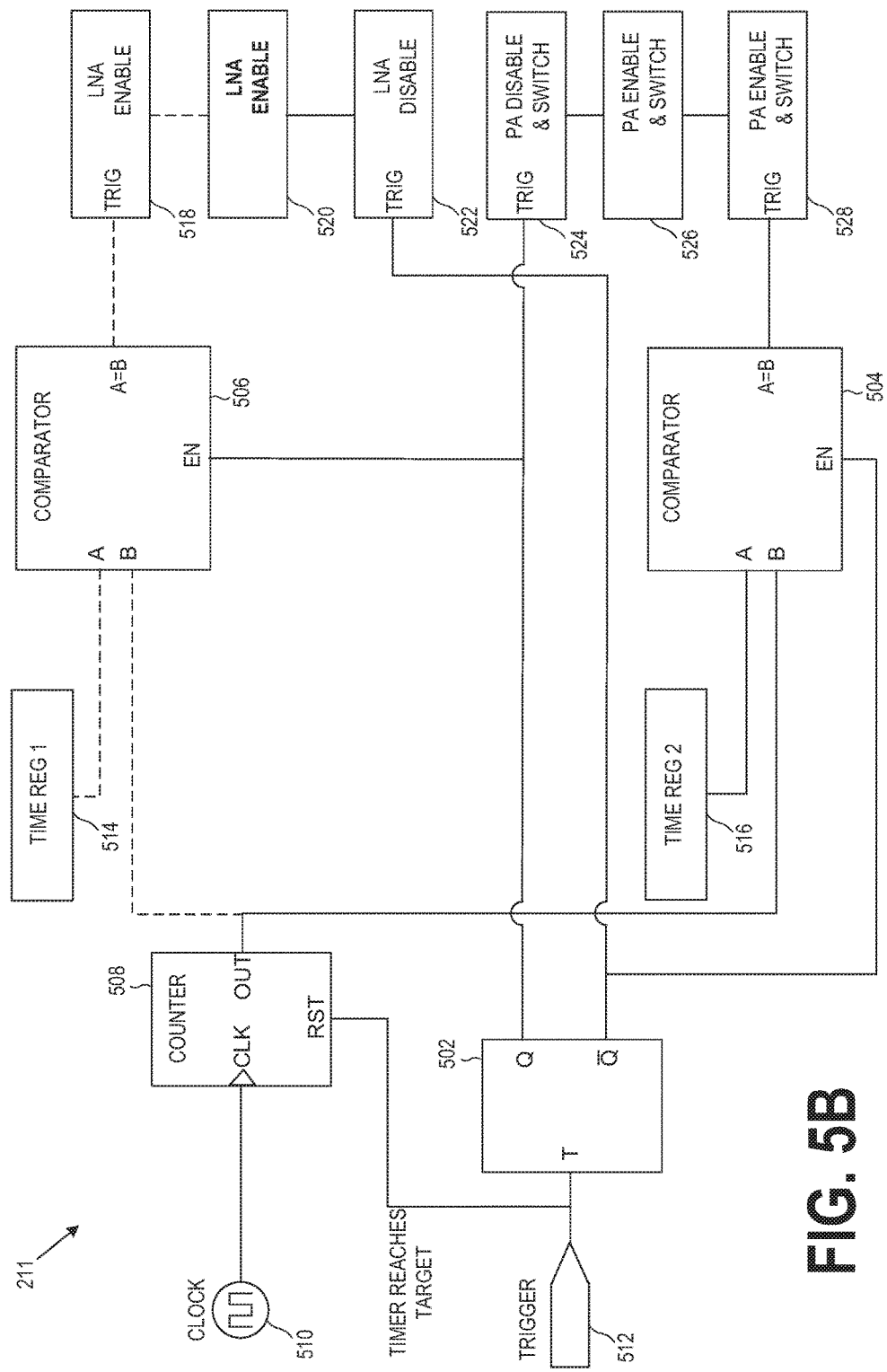

Upon receiving a new trigger signal 412, the flip-flop 402 changes its state. FIG. 5A and FIG. 5B illustrate sequence trigger circuitry during a Tx-to-Rx switching operation in accordance with some aspects of the present disclosure. The sequence trigger circuit elements indicated in FIGS. 5A-5B correspond to (and have the same functionalities as) the corresponding elements in FIGS. 4A-4B. For example, elements 402, 404, 406, 408, 410, 412, 414, 416, 418, 420, 422, 424, 426, and 428 in FIGS. 4A-4B correspond to elements 502, 504, 506, 508, 510, 512, 514, 516, 518, 520, 522, 524, 526, and 528 in FIGS. 5A-5B.

Referring to FIGS. 5A, 5B, and 6, in an example operation, the RFFE (e.g., 200) may be in a transmit mode when a single trigger signal 512 is communicated and received by the flip-flop 502. For example and as seen in diagram 600, the RFFE 200 may be in a transmit mode 606.

The trigger signal 512 is also communicated to the reset (RST) terminal of the counter 508, resulting in a reset of the counter 508. The flip-flop 502 can now activate a second output (e.g., the Q output) resulting in the trigger signal enabling the comparator 506 and the shadow register 524. The "PA disable and switch" command sequence stored within shadow register 524 is stored in the active register 526 and executed, resulting in disabling the PA 208 and the RFFE being switched to a receive communication mode. The "PA disable and switch" state is indicated as 608 in FIG. 6. After the clock output signal reaches the time value in register 514, the trigger signal is also output by comparator 506 to shadow register 518 (as seen in FIG. 5B). The "LNA enable" command sequence stored within shadow register 518 is stored in the active register 520 and executed, resulting in enabling the LNA 206. The "LNA enable" state is indicated as 610 in FIG. 6. After settling time, the RFFE is settled in a receive communication mode (e.g., at 612 in FIG. 6).

In an example, the sequence trigger circuit 211 may be used in connection with switching between other communication modes of the RFFE, such as receive only mode and transmit only mode.

Figure 7:
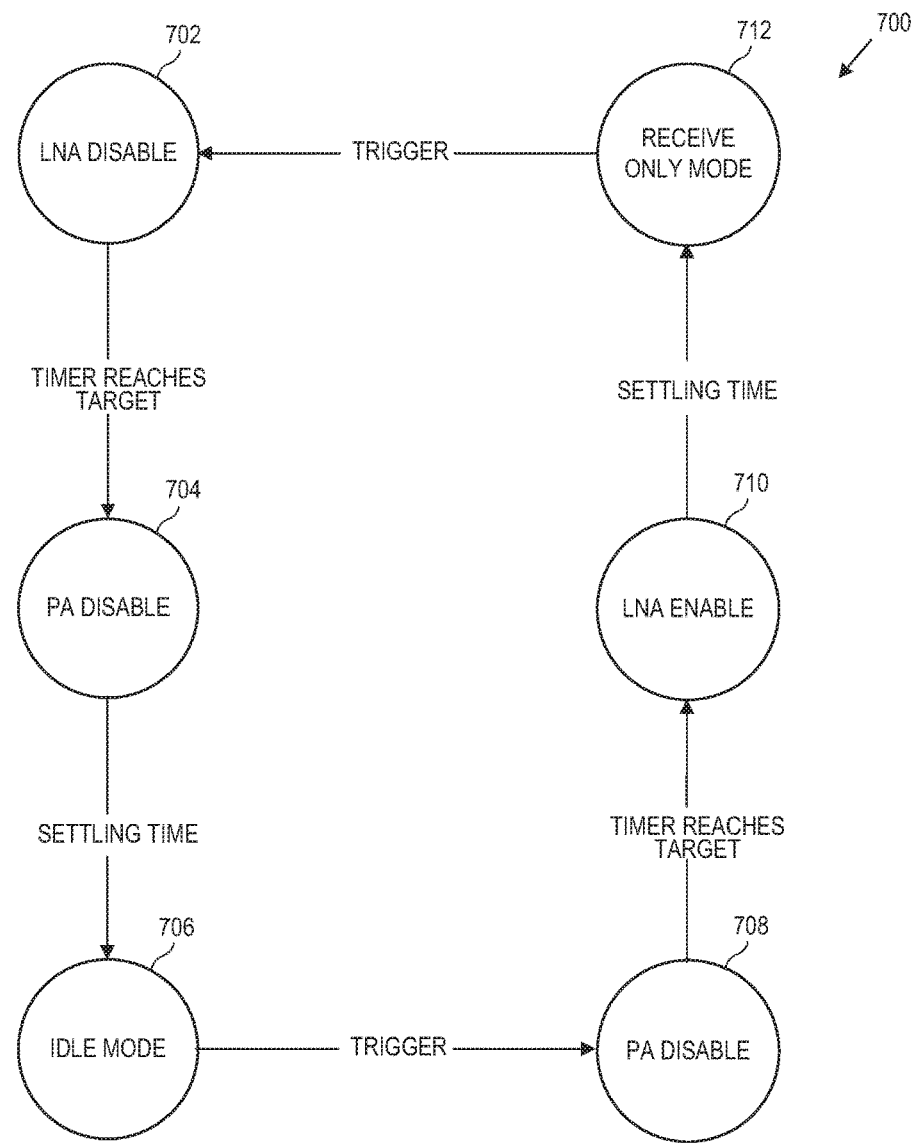
FIG. 7 is a state diagram illustrating functionalities performed by a sequence trigger circuitry during receive only communication mode in accordance with some aspects of the present disclosure.

FIG. 7 is a state diagram illustrating functionalities performed by a sequence trigger circuitry during receive only communication mode in accordance with some aspects of the present disclosure. Referring to FIGS. 4A, 4B, and 7, in an example operation, the RFFE 200 may be in a data receive only mode when a single trigger signal 412 is communicated and received by the flip-flop 402. For example and as seen in diagram 700, the RFFE 200 may be in a "receive only" mode 712.

The trigger signal 412 is also communicated to the reset (RST) terminal of the counter 408, resulting in a reset of the counter 408. The flip-flop 402 can activate the first output (Q) resulting in the trigger signal enabling the comparator 404 and the shadow register 422. The LNA disable command sequence stored within shadow register 422 is stored in the active register 420 and executed, resulting in disabling the LNA 206. The "LNA disable" state is indicated as 702 in FIG. 7. After the clock output signal reaches the time value in register 416, the trigger signal is also output by comparator 404 to shadow register 428 (as seen in FIG. 4B). The shadow register 428 may store a "PA disable" command sequence, which is stored within the active register 426 and executed, resulting in disabling the PA 208. The "PA disable" state is indicated as 704 in FIG. 7. After settling time has passed, both the PA and the LNA are disabled and the RFFE is in idle mode (706).

The RFFE 200 may be in an idle mode when a new trigger signal 412 is communicated and received by the flip-flop 402. For example and as seen in diagram 700, the RFFE 200 may be in an idle mode 706.

The trigger signal 412 is also communicated to the reset (RST) terminal of the counter 408, resulting in a reset of the counter 408. The flip-flop 402 can now activate a second output (e.g., the Q output) resulting in the trigger signal enabling the comparator 406 and the shadow register 424. The "PA disable" command sequence stored within shadow register 424 is stored in the active register 426 and executed, resulting in disabling the PA 208 (state 708). In this regard, when the RFFE operates in "receive only" mode, both shadow registers 424 and 428 store "PA disable" command sequence, which is executed twice (e.g., as seen at 704 and 708 in state diagram 700).

After the clock output signal reaches the time value in register 414, the trigger signal is also output by comparator 406 to shadow register 418. The "LNA enable" command sequence stored within shadow register 418 is stored in the active register 420 and executed, resulting in enabling the LNA 206. The "LNA enable" state is indicated as 710 in FIG. 7. After settling time, the RFFE is settled in the "receive only" communication mode (e.g., at 712 in FIG. 7).

Figure 8:
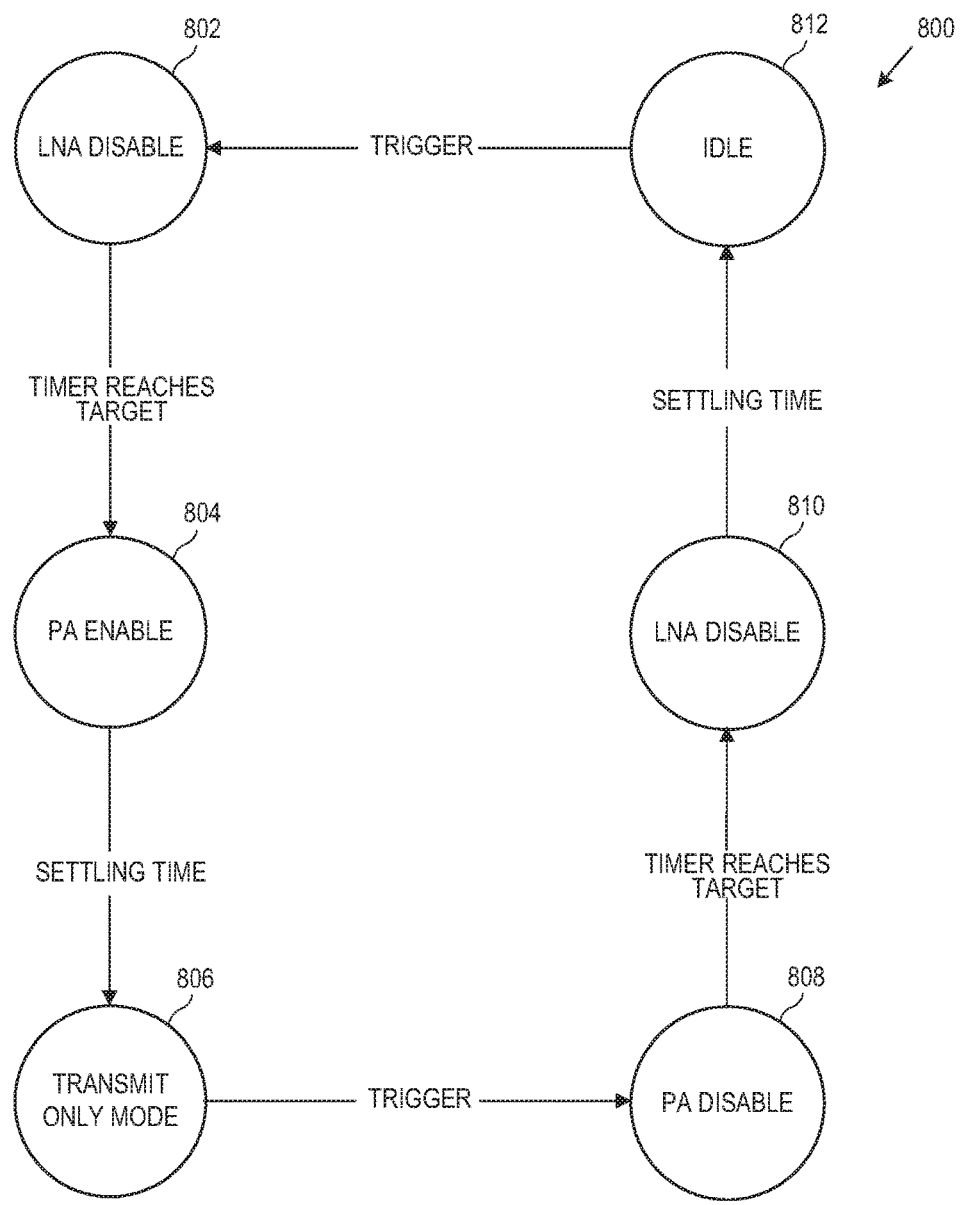
FIG. 8 is a state diagram illustrating functionalities performed by a sequence trigger circuitry during transmit only communication mode in accordance with some aspects of the present disclosure.

FIG. 8 is a state diagram illustrating functionalities performed by a sequence trigger circuitry during transmit only communication mode in accordance with some aspects of the present disclosure. Referring to FIGS. 5A, 5B, and 8, in an example operation, the RFFE 200 may be in a "transmit only" mode when a single trigger signal 512 is communicated and received by the flip-flop 502. For example and as seen in diagram 800, the RFFE 200 may be in a "transmit only" mode 806.

The trigger signal 512 is also communicated to the reset (RST) terminal of the counter 508, resulting in a reset of the counter 508. The flip-flop 502 can activate the second output (Q) resulting in the trigger signal enabling the comparator 506 and the shadow register 524. The PA disable command sequence stored within shadow register 524 is stored in the active register 526 and executed, resulting in disabling the PA 208. The "PA disable" state is indicated as 808 in FIG. 8. After the clock output signal reaches the time value in register 514, the trigger signal is also output by comparator 506 to shadow register 518 (as seen in FIG. 5B). The shadow register 518 may store a "LNA disable" command sequence, which is stored within the active register 520 and executed, resulting in disabling the LNA 206. The "LNA disable" state is indicated as 810 in FIG. 8. After settling time has passed, both the PA and the LNA are disabled and the RFFE is in idle mode (812).

The RFFE 200 may be in an idle mode when a new trigger signal 512 is communicated and received by the flip-flop 502. For example and as seen in diagram 800, the RFFE 200 may be in an idle mode 812.

The trigger signal 512 is also communicated to the reset (RST) terminal of the counter 508, resulting in a reset of the counter 508. The flip-flop 502 can now activate the first output resulting in the trigger signal enabling the comparator 504 and the shadow register 522. The "LNA disable" command sequence stored within shadow register 522 is stored in the active register 520 and executed, resulting in disabling the LNA 206 (state 802). In this regard, when the RFFE operates in "transmit only" mode, both shadow registers 518 and 522 store a "LNA disable" command sequence, which is executed twice (e.g., as seen at 810 and 802 in state diagram 800).

After the clock output signal reaches the time value in register 516, the trigger signal is also output by comparator 504 to shadow register 528. The "PA enable" command sequence stored within shadow register 528 is stored in the active register 526 and executed, resulting in enabling the PA 208. The "PA enable" state is indicated as 804 in FIG. 8. After settling time, the RFFE is settled in the "transmit only" communication mode (e.g., at 806 in FIG. 8).

Figure 9:
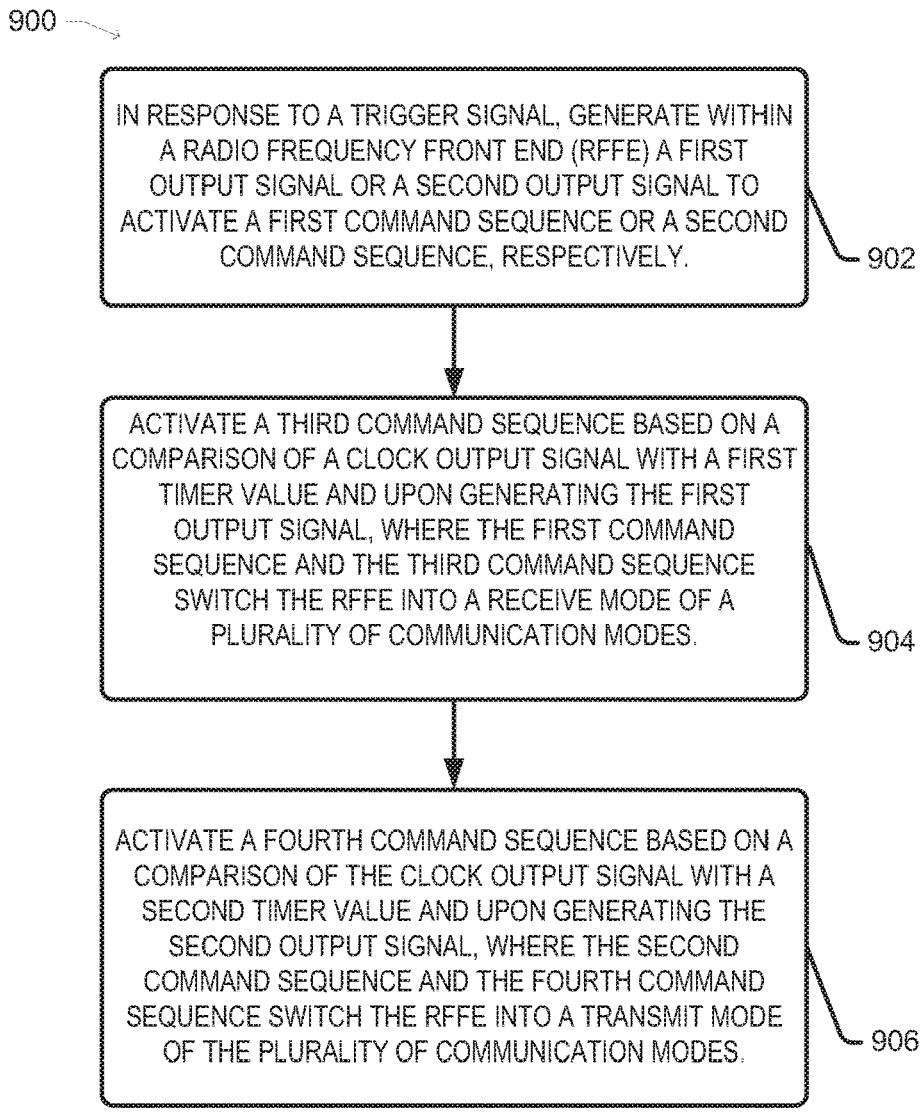
FIG. 9 and FIG. 10 are example flow diagrams of methods for switching between communication modes of a radio frequency front-ends (RFFEs) using sequence trigger circuitry in accordance with some aspects of the present disclosure.
Figure 10:
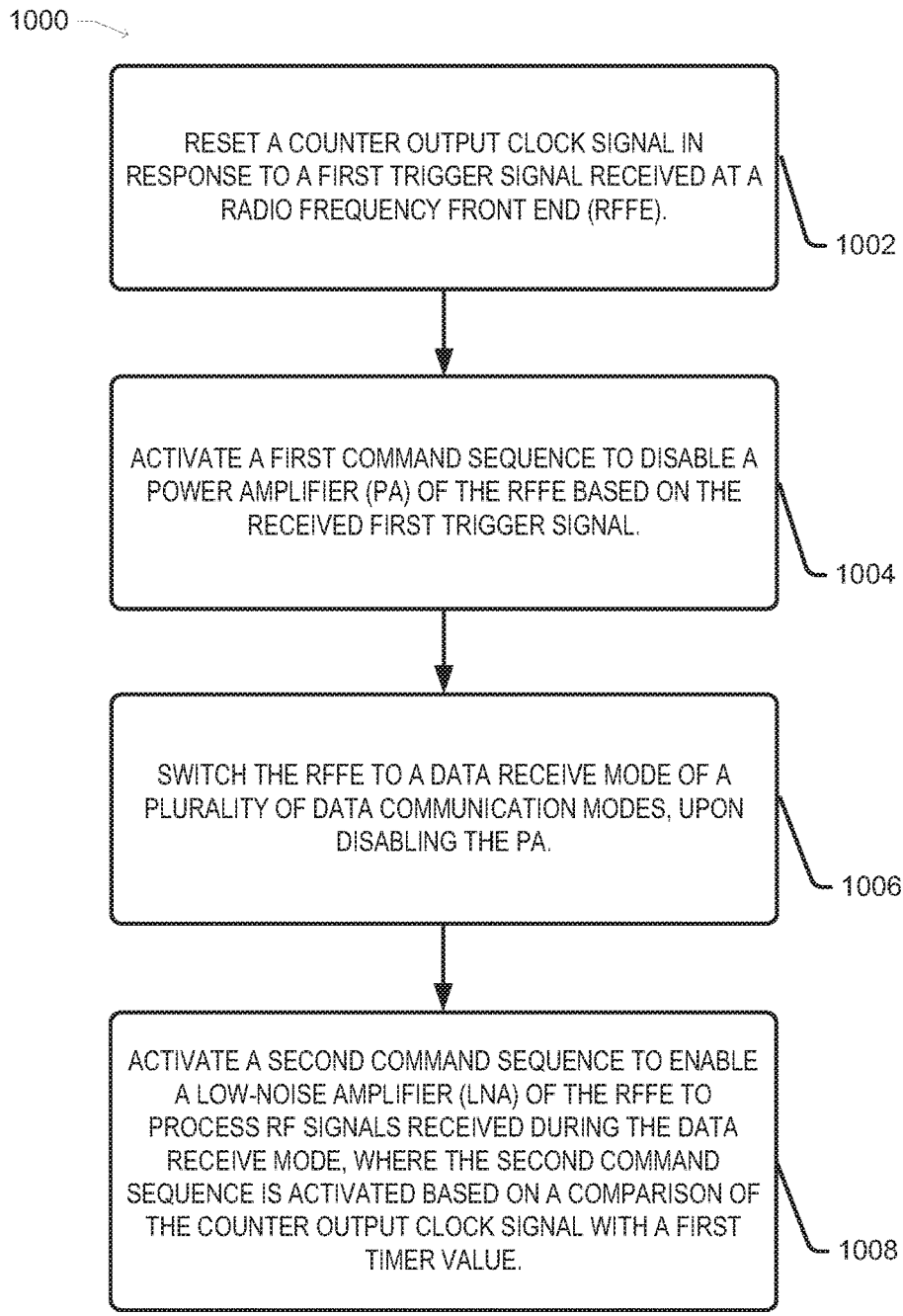

FIG. 9 and FIG. 10 are example flow diagrams of methods for switching between communication modes of a radio frequency front-ends (RFFEs) using sequence trigger circuitry in accordance with some aspects of the present disclosure. Referring to FIG. 9, the example method 900 may start at 902, when in response to a trigger signal, a first output signal or a second output signal may be generated within a radio frequency front end (RFFE). For example, the flip-flop circuit 402 within the sequence trigger circuit 211 can receive a trigger signal 412 to activate a first command sequence (e.g., sequence stored within register 424) or a second command sequence, respectively (e.g., command sequence stored in register 422). At 904, a third command sequence may be activated (e.g., sequence stored in register 418) based on a comparison of a clock output signal with a first timer value (e.g., timer value within register 414) and upon generating the first output signal (e.g., comparator is activated by the first output signal (Q output) from flip-flop 402. The first command sequence (e.g., PA disable and switch sequence in register 424) and the third command sequence (e.g., LNA enable sequence in register 418) switch the RFFE into a receive mode of a plurality of communication modes.

At 906, a fourth command sequence may be executed based on a comparison of the clock output signal with a second timer value and upon generating the second output signal. For example, when the flip-flop 402 outputs the trigger signal at the Q output, the second command sequence (e.g., LNA disable sequence stored in register 422) and the fourth command sequence (e.g., PA enable and switch to transmit sequence stored in register 428) can be executed. The second command sequence and the fourth command sequence can be used to switch the RFFE into a transmit mode of the plurality of communication modes.

Referring to FIG. 10, the example method 1000 may start at 1002, when a counter output clock signal is reset in response to a first trigger signal received at a radio frequency front end (RFFE). For example, the sequence trigger circuit 211 can receive a first trigger signal 412, which can reset the clock counter 408. At 1004, a first command sequence may be activated to disable a power amplifier (PA) of the RFFE based on the received first trigger signal. For example, the trigger signal 412 can activate the Q output of the flip-flop 402 so that the trigger signal is communicated to register 424, activating the "PA disable and switch" command sequence. At 1006, the RFFE 200 can be switched to a receive mode of a plurality of data communication modes, upon disabling the PA. At 1008, a second command sequence can be activated to enable a low-noise amplifier (LNA) of the RFFE to process RF signals received during the receive mode. For example, the Q output from the flip-flop 402 also enables comparator 406. The second command sequence (e.g., the LNA enable sequence in register 418) is activated based on a comparison of the counter output clock signal with a first timer value (e.g., the timer value stored in register 414).

Even though the sequence trigger circuit 211 is illustrated (e.g., in FIGS. 4A-5B) as including only two active registers and two shadow registers per active register, the disclosure is not limited in this regard. For example, more than two active registers can be included, with each active register being associated with a circuitry that can be controlled via one or more command sequences stored in corresponding shadow registers of the active register. Additionally, more than two shadow registers can be used per active register, with each shadow register storing command sequences to be executed during a certain operating mode.

Additional Notes & Examples

Example 1 is a radio frequency (RF) front end (RFFE) circuit, comprising: a first circuit for processing received RF signals during a receive operating mode state; a second circuit for processing RF signals for transmission during a transmit operating mode state; and sequence trigger circuitry comprising two active registers, each active register being coupled to two shadow registers, the sequence trigger circuitry configured to: store a first set of command sequences within the two shadow registers of a first of the two active registers, the first set of command sequences associated with controlling the first circuit; store a second set of command sequences within the two shadow registers of a second of the two active registers, the second set of command sequences associated with controlling the second circuit; and in response to receiving successive trigger signals and for each of the active registers, alternate between loading command sequences stored in a first of the two shadow registers or a second of the two shadow registers within the active register for execution.

In Example 2, the subject matter of Example 1 optionally includes wherein the sequence trigger circuitry further comprises: a third shadow register for each of the active registers, the third active register storing command sequences for controlling circuitry of the RFFE during at least one other operating mode state of the RFFE.

In Example 3, the subject matter of any one or more of Examples 1-2 optionally include wherein: a first portion of the first set of command sequences stored in a first shadow register of the two shadow registers of the first active register is associated with controlling the first circuit during the receive operating mode; and a second portion of the first set of command sequences stored in a second shadow register of the two shadow registers of the first active register is associated with controlling the first circuit during the transmit operating mode.

In Example 4, the subject matter of any one or more of Examples 1-3 optionally include wherein: a first portion of the second set of command sequences stored in a first shadow register of the two shadow registers of the second active register is associated with controlling the second circuit during the receive operating mode; and a second portion of the second set of command sequences stored in a second shadow register of the two shadow registers of the second active register is associated with controlling the second circuit during the transmit operating mode.

In Example 5, the subject matter of any one or more of Examples 1-4 optionally include wherein: the at least first circuit is a low-noise amplifier (LNA) configured to amplify a first RF signal for processing by baseband circuitry, the first RF signal received during the receive operating mode state of the RFFE; and the at least second circuit is a power amplifier configured to amplify a second RF signal output by the baseband circuitry for transmission during the transmit operating mode state of the RFFE.

Example 6 is sequence trigger circuitry configured to repeat command sequences to switch between a plurality of communication modes of a radio frequency front end (RFFE), the sequence trigger circuitry comprising: a first logic circuitry configured to: in response to a trigger signal, generate a first output signal or a second output signal to activate a first command sequence or a second command sequence, respectively; a second logic circuitry configured to: activate a third command sequence based on a comparison of a clock output signal with a first timer value and upon generating the first output signal, wherein the first command sequence and the third command sequence switch the RFFE into a receive mode of the plurality of communication modes; and a third logic circuitry configured to: activate a fourth command sequence based on a comparison of the clock output signal with a second timer value and upon generating the second output signal, wherein the second command sequence and the fourth command sequence switch the RFFE into a transmit mode of the plurality of communication modes.

In Example 7, the subject matter of Example 6 optionally includes wherein: the first logic circuitry comprises a flip-flop; and the second logic circuitry and the third logic circuitry are comparators.

In Example 8, the subject matter of any one or more of Examples 6-7 optionally include wherein the first logic circuitry is configured to: enable the second logic circuitry via the first output signal; and enable the third logic circuitry via the second output signal.

In Example 9, the subject matter of any one or more of Examples 6-8 optionally include counter circuitry configured to: receive a clock signal input and the trigger signal; and generate the clock output signal in response to the clock signal input.

In Example 10, the subject matter of any one or more of Examples 6-9 optionally include wherein the first logic circuitry is configured to: receive the trigger signal during the receive mode of the RFFE; generate the second output signal to: activate the second command sequence to disable a low-noise amplifier (LNA) of the RFFE; and enable the second comparator.

In Example 11, the subject matter of Example 10 optionally includes wherein the third logic circuitry is configured to, upon the clock output signal reaching the second timer value, activate the fourth command sequence to: enable a power amplifier (PA) of the RFFE; and switch the RFFE to the transmit mode.

In Example 12, the subject matter of any one or more of Examples 6-11 optionally include wherein the first logic circuitry is configured to: receive the trigger signal during a data transmission mode of the RFFE; generate the first output signal to: activate the first command sequence to disable a power amplifier (PA) of the RFFE; switch the RFFE to the receive mode; and enable the second logic circuitry.

In Example 13, the subject matter of Example 12 optionally includes wherein the second logic circuitry is configured to: upon the clock output signal reaching the first timer value, activate the third command sequence to enable a low-noise amplifier (LNA) of the RFFE.

In Example 14, the subject matter of any one or more of Examples 6-13 optionally include wherein the first logic circuitry is configured to: receive the trigger signal during a receive only mode of the RFFE; generate the second output signal to: activate the second command sequence to disable a low-noise amplifier (LNA) of the RFFE; and enable the third logic circuitry.

In Example 15, the subject matter of Example 14 optionally includes wherein the third logic circuitry is configured to, upon the clock output signal reaching the second timer value, activate the fourth command sequence to: disable a power amplifier (PA) of the RFFE; and switch the RFFE to idle mode.

In Example 16, the subject matter of Example 15 optionally includes wherein the first logic circuitry is configured to: receive a second trigger signal while in the idle mode; reset the clock output signal; generate the first output signal to: activate the first command sequence to disable the PA of the RFFE; and enable the second logic circuitry.

In Example 17, the subject matter of Example 16 optionally includes wherein the second logic circuitry is configured to, upon the clock output signal reaching the first timer value, activate the third command sequence to: enable the LNA of the RFFE; and resume the receive only mode.

In Example 18, the subject matter of any one or more of Examples 6-17 optionally include wherein the first logic circuitry is configured to: receive the trigger signal during a transmit only mode of the RFFE; generate the first output signal to: activate the first command sequence to disable a power amplifier (PA) of the RFFE; and enable the second logic circuitry.

In Example 19, the subject matter of Example 18 optionally includes wherein the second logic circuitry is configured to, upon the clock output signal reaching the first timer value, activate the third command sequence to: disable a low-noise amplifier (LNA) of the RFFE; and switch the RFFE to idle mode.

In Example 20, the subject matter of Example 19 optionally includes wherein the first logic circuitry is configured to: receive a second trigger signal while in the idle mode; reset the clock output signal; generate the second output signal to: activate the second command sequence to disable the LNA of the RFFE; and enable the third logic circuitry.

In Example 21, the subject matter of Example 20 optionally includes wherein the third logic circuitry is configured to, upon the clock output signal reaching the second timer value, activate the fourth command sequence to: enable the PA of the RFFE; and resume the transmit only mode.

Example 22 is a radio frequency (RF) front end (RFFE) apparatus, comprising: a low-noise amplifier (LNA) configured to amplify a first RF signal for processing by baseband circuitry, the first RF signal received during a receive mode of the RFFE; a power amplifier configured to amplify a second RF signal output by the baseband circuitry for transmission during a transmit mode of the RFFE; and sequence trigger circuitry coupled to the LNA and the PA, the sequence trigger circuitry configured to: in response to a first trigger signal: activate a first command sequence to disable the PA and switch the RFFE to the receive mode; and activate a second command sequence to enable the LNA to process RF signals received during the receive mode; and in response to a second trigger signal: activate a third command sequence to disable the LNA; and activate a fourth command sequence to enable the PA and switch the RFFE to the transmit mode.

In Example 23, the subject matter of Example 22 optionally includes wherein the sequence trigger circuitry further comprises: a first logic circuitry configured to: in response to the first trigger signal, generate a first output signal to activate the first command sequence to disable the PA and switch the RFFE to the receive mode; and in response to the second trigger signal, generate a second output signal to activate the third command sequence to disable the LNA.

In Example 24, the subject matter of Example 23 optionally includes wherein the sequence trigger circuitry further comprises: a second logic circuitry configured to: activate the second command sequence based on a comparison of a clock output signal with a first timer value and upon generating the first output signal.

In Example 25, the subject matter of Example 24 optionally includes wherein the sequence trigger circuitry further comprises: a third logic circuitry configured to: activate the fourth command sequence based on a comparison of the clock output signal with a second timer value and upon generating the second output signal.

In Example 26, the subject matter of Example 25 optionally includes wherein: the first logic circuitry is a flip-flop; and the second logic circuitry and the third logic circuitry are comparators.

In Example 27, the subject matter of any one or more of Examples 25-26 optionally include wherein the sequence trigger circuitry further comprises: a counter circuitry configured to generate the clock output signal in response to a clock signal input.

In Example 28, the subject matter of any one or more of Examples 25-27 optionally include wherein the sequence trigger circuitry further comprises: a first shadow register configured to store the first command sequence to disable the PA and to switch the RFFE to the receive mode; a second shadow register configured to store the second command sequence to enable the LNA; a third shadow register configured to store the third command sequence to disable the LNA; and a fourth shadow register configured to store the fourth command sequence to enable the PA and switch the RFFE to the transmit mode.

In Example 29, the subject matter of Example 28 optionally includes wherein the sequence trigger circuitry further comprises: a first active register coupled to the second shadow register and the third shadow register; and a second active register coupled to the first shadow register and the fourth shadow register.

In Example 30, the subject matter of any one or more of Examples 22-29 optionally include wherein the sequence trigger circuitry is configured to: receive a third trigger signal during a receive only communication mode of the RFFE; modify the fourth command sequence to include one or more commands to disable the PA; in response to the third trigger signal: activate the third command sequence to disable the LNA; and activate the fourth command sequence to disable the PA and switch the RFFE to idle mode.

In Example 31, the subject matter of Example 30 optionally includes wherein the sequence trigger circuitry is configured to: receive a fourth trigger signal while in the idle mode; in response to the fourth trigger signal: activate the first command sequence to disable the PA of the RFFE; and activate the second command sequence to enable the LNA of the RFFE to resume the receive only communication mode.

In Example 32, the subject matter of any one or more of Examples 22-31 optionally include wherein the sequence trigger circuitry is configured to: receive a third trigger signal during a transmit only communication mode of the RFFE; modify the second command sequence to include one or more commands to disable the LNA; in response to the third trigger signal: activate the first command sequence to disable the PA; and activate the second command sequence to disable the LNA and switch the RFFE to idle mode.

In Example 33, the subject matter of Example 32 optionally includes wherein the sequence trigger circuitry is configured to: receive a fourth trigger signal while in the idle mode; in response to the fourth trigger signal: activate the third command sequence to disable the LNA of the RFFE; and activate the fourth command sequence to enable the PA of the RFFE to resume the transmit only communication mode.

Example 34 is a method for switching between a plurality of data communication modes of a radio frequency front end (RFFE), the method comprising: in response to a first trigger signal: resetting a counter output clock signal; activating a first command sequence to disable a power amplifier (PA) of the RFFE; and switching the RFFE to a data receive mode of the plurality of data communication modes, upon disabling the PA; and activating a second command sequence to enable a low-noise amplifier (LNA) to process RF signals received during the receive mode, wherein the second command sequence is activated based on a comparison of the counter output clock signal with a first timer value.

In Example 35, the subject matter of Example 34 optionally includes in response to a second trigger signal, resetting the counter output clock signal; activating a third command sequence to disable the LNA of the RFFE, upon receiving the second trigger signal; and activating a fourth command sequence to enable the PA and switch the RFFE to a data transmit mode of the plurality of data communication modes, wherein the fourth command sequence is activated based on a comparison of the counter output clock signal with a second timer value.

In Example 36, the subject matter of Example 35 optionally includes retrieving the first command sequence, the second command sequence, the third command sequence, and the fourth command sequence from on-chip memory within the RFFE.

Example 37 is a radio frequency (RF) front end (RFFE) circuit, comprising: at least a first circuit for processing received RF signals during a receive operating mode state; and sequence trigger circuitry comprising at least one active register, the at least one active register being coupled to two shadow registers, the sequence trigger circuitry configured to: store a first set of command sequences within the two shadow registers of the at least one active register, the first set of command sequences associated with controlling the at least first circuit during the receive operating mode state; and in response to receiving successive trigger signals: alternate between loading command sequences stored in a first of the two shadow registers or a second of the two shadow registers within the at least one active register for execution during the receive operating mode state.

In Example 38, the subject matter of Example 37 optionally includes wherein the sequence trigger circuitry configured to: store a second set of command sequences within the two shadow registers of a second active register, the second set of command sequences associated with controlling the at least first or at least a second circuit during the receive operating mode state or an idle operating mode state.

The above detailed description includes references to the accompanying drawings, which form a part of the detailed description. The drawings show, by way of illustration, specific aspects of the present disclosure that may be practiced. These aspects of the present disclosure are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

The above description is intended to be illustrative, and not restrictive. For example, the above-described examples (or one or more aspects thereof) may be used in combination with others. Other aspects of the present disclosure may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as aspects of the present disclosure may feature a subset of said features. Further, aspects of the present disclosure may include fewer features than those disclosed in a particular example. Thus, the following claims are hereby incorporated into the Detailed Description, with a claim standing on its own as a separate embodiment. The scope of the aspects of the present disclosure disclosed herein is to be determined with reference to the appended claims, along with the full scope of equivalents to which such claims are entitled.

What is claimed is:

1. Sequence trigger circuitry configured to repeat command sequences to switch between a plurality of communication modes of a radio frequency front end (RFFE), the sequence trigger circuitry comprising:
a first logic circuitry configured to:
in response to a trigger signal, generate a first output signal or a second output signal to activate a first command sequence or a second command sequence, respectively;
a second logic circuitry configured to:
activate a third command sequence based on a comparison of a clock output signal with a first timer value and upon generating the first output signal, wherein the first command sequence and the third command sequence switch the RFFE into a receive mode of the plurality of communication modes; and
a third logic circuitry configured to:
activate a fourth command sequence based on a comparison of the clock output signal with a second timer value and upon generating the second output signal, wherein the second command sequence and the fourth command sequence switch the RFFE into a transmit mode of the plurality of communication modes.

2. The sequence trigger circuitry of claim 1, wherein:
the first logic circuitry comprises a flip-flop; and
the second logic circuitry and the third logic circuitry are comparators.

3. The sequence trigger circuitry of claim 1, wherein the first logic circuitry is configured to:
enable the second logic circuitry via the first output signal; and
enable the third logic circuitry via the second output signal.

4. The sequence trigger circuitry of claim 1, further comprising:
counter circuitry configured to:
receive a clock signal input and the trigger signal; and
generate the clock output signal in response to the clock signal input.

5. The sequence trigger circuitry of claim 1, wherein the first logic circuitry is configured to:
receive the trigger signal during the receive mode of the RFFE; and
generate the second output signal to:
activate the second command sequence to disable a low-noise amplifier (LNA) of the RFFE; and
enable the second comparator.

6. The sequence trigger circuitry of claim 5, wherein the third logic circuitry is configured to, upon the clock output signal reaching the second timer value, activate the fourth command sequence to:
enable a power amplifier (PA) of the RFFE; and
switch the RFFE to the transmit mode.

7. The sequence trigger circuitry of claim 1, wherein the first logic circuitry is configured to:
receive the trigger signal during a data transmission mode of the RFFE; and
generate the first output signal to:
activate the first command sequence to disable a power amplifier (PA) of the RFFE;
switch the RFFE to the receive mode; and
enable the second logic circuitry.

8. The sequence trigger circuitry of claim 7, wherein the second logic circuitry is configured to:
upon the clock output signal reaching the first timer value, activate the third command sequence to enable a low-noise amplifier (LNA) of the RFFE.

9. The sequence trigger circuitry of claim 1, wherein the first logic circuitry is configured to:
receive the trigger signal during a receive only mode of the RFFE; and
generate the second output signal to:
activate the second command sequence to disable a low-noise amplifier (LNA) of the RFFE; and
enable the third logic circuitry.

10. The sequence trigger circuitry of claim 9, wherein the third logic circuitry is configured to, upon the clock output signal reaching the second timer value, activate the fourth command sequence to:
disable a power amplifier (PA) of the RFFE; and
switch the RFFE to idle mode.

11. The sequence trigger circuitry of claim 10, wherein the first logic circuitry is configured to:
receive a second trigger signal while in the idle mode;
reset the clock output signal; and
generate the first output signal to:
activate the first command sequence to disable the PA of the RFFE; and
enable the second logic circuitry.

12. The sequence trigger circuitry of claim 11, wherein the second logic circuitry is configured to, upon the clock output signal reaching the first timer value, activate the third command sequence to:
enable the LNA of the RFFE; and
resume the receive only mode.

13. The sequence trigger circuit of claim 1, wherein the first logic circuitry is configured to:
receive the trigger signal during a transmit only mode of the RFFE; and
generate the first output signal to:
activate the first command sequence to disable a power amplifier (PA) of the RFFE; and
enable the second logic circuitry.

14. The sequence trigger circuit of claim 13, wherein the second logic circuitry is configured to, upon the clock output signal reaching the first timer value, activate the third command sequence to:
disable a low-noise amplifier (LNA) of the RFFE; and
switch the RFFE to idle mode.

15. The sequence trigger circuitry of claim 14, wherein the first logic circuitry is configured to:
receive a second trigger signal while in the idle mode;
reset the clock output signal; and
generate the second output signal to:
activate the second command sequence to disable the LNA of the RFFE; and
enable the third logic circuitry.

16. The sequence trigger circuitry of claim 15, wherein the third logic circuitry is configured to, upon the clock output signal reaching the second timer value, activate the fourth command sequence to:
enable the PA of the RFFE; and
resume the transmit only mode.

17. A radio frequency (RF) front end (RFFE) apparatus, comprising:
a low-noise amplifier (LNA) configured to amplify a first RF signal for processing by baseband circuitry, the first RF signal received during a receive mode of the RFFE;
a power amplifier (PA) configured to amplify a second RF signal output by the baseband circuitry for transmission during a transmit mode of the RFFE, the PA being different than the LNA;
sequence trigger circuitry coupled to the LNA and the PA, the sequence trigger circuitry comprising a plurality of registers and configured to:
in response to a first trigger signal:
activate a first command sequence stored in a first register of the plurality of registers to disable the PA and switch the RFFE to the receive mode; and
activate a second command sequence stored in a second register of the plurality of registers to enable the LNA to process RF signals received during the receive mode; and
in response to a second trigger signal:
activate a third command sequence stored in a third register of the plurality of registers to disable the LNA; and
activate a fourth command sequence stored in a fourth register of the plurality of registers to enable the PA and switch the RFFE to the transmit mode;
a first logic circuit configured to:

in response to the first trigger signal, generate a first output signal to activate the first command sequence to disable the PA and switch the RFFE to the receive mode; and in response to the second trigger signal, generate a second output signal to activate the third command sequence to disable the LNA; and a second logic circuitry configured to:

activate the second command sequence based on a comparison of a clock output signal with a first timer value and upon generating the first output signal.

18. The RFFE circuit of claim 17, wherein the sequence trigger circuitry further comprises:

a third logic circuitry configured to:

activate the fourth command sequence based on a comparison of the clock output signal with a second timer value and upon generating the second output signal.

* * * * *

UNITED STATES PATENT AND TRADEMARK OFFICE
CERTIFICATE OF CORRECTION

PATENT NO. : 10,432,247 B2
APPLICATION NO. : 15/464000
DATED : October 1, 2019
INVENTOR(S) : Pawliuk et al.

Page 1 of 1

It is certified that error appears in the above-identified patent and that said Letters Patent is hereby corrected as shown below:

In the Claims

In Column 16, Line 67, in Claim 17, delete "circuit" and insert --circuitry-- therefor Signed and Sealed this
Twelfth Day of May, 2020

Andrei Iancu
*Director of the United States Patent and Trademark Office*